Dec. 20, 1938.    D. E. MARSHALL    2,140,918
SYSTEM FOR POLICING VEHICLES IN TRAFFIC
Filed Dec. 7, 1935

INVENTOR.
Donald E. Marshall,
BY
ATTORNEY

Patented Dec. 20, 1938

2,140,918

UNITED STATES PATENT OFFICE 2,140,918

SYSTEM FOR POLICING VEHICLES IN TRAFFIC

Donald E. Marshall, Palos Verdes Estates, Calif.

Application December 7, 1935, Serial No. 53,332

8 Claims. (Cl. 177—311.5)

My invention relates to means for indicating the speed of a vehicle and is particularly adapted to indicate the speed at a location remote from the moving vehicle. The invention is of especial utility in connection with automotive vehicles, in which case the speed may be indicated on another vehicle, for instance, that of a patrolling police officer. Thus my invention provides an efficient means for locating violators of the speed laws as well as for determining the approximate speed at which they are traveling.

It is an object of my invention to provide a means and method whereby the speed of a vehicle may be indicated at a point remote from and unconnected with the moving vehicle.

Another object of the invention is to provide means for transmitting from a moving vehicle an electromagnetic or radio signal having some characteristic determined by the speed of the vehicle, and means for receiving at some remote point the transmitted radio signal and determining therefrom the speed of the vehicle from which the signal emanates. For example, in one practice of the invention I may provide the vehicle with a radio transmitter adjusted to deliver a carrier wave at a predetermined frequency, this transmitter having a means for modulating the carrier wave to different sound frequencies in accordance with the speed at which the vehicle is travelling.

Another object is to provide means for sending from a moving vehicle a modulated radio wave having a frequency determined by the speed of the vehicle and means for selectively receiving these varied-frequency waves at some remote point to determine the corresponding speed.

Still another object of my invention is to provide a means of varying the frequency of a transmitted radio wave in response to the speed of a vehicle, which means may be employed in connection with a speedometer operating on the principle of those now in common use.

These and other objects I attain in a manner which will be clear from a consideration of the following description taken in connection with the accompanying drawing, of which:

My invention contemplates transmitting from a moving vehicle a radio signal having some characteristic which is controlled by the speed of the vehicle. I have illustrated my invention in the form wherein I vary the carrier frequency of the transmited wave in response to speed of the vehicle. In this form I choose a plurality of consecutive speed ranges and transmit a modulated radio wave having a radio frequency different for each speed range.

Figure 1:
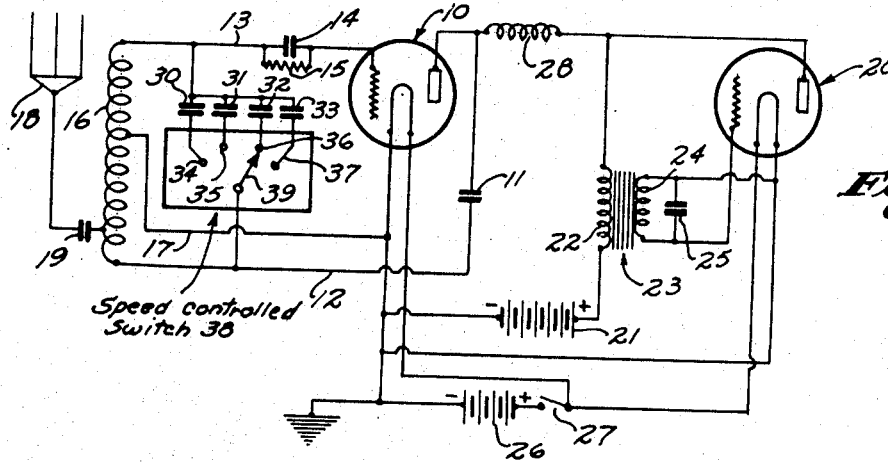
Fig. 1 is a diagram of the electrical circuit employed in transmitting the speed-controlled signal from a moving vehicle.

The electrical circuit employed for this purpose is shown in Fig. 1. A vacuum tube 10, which may be a type '30 triode tube is employed as oscillator. The plate or anode of this tube is connected through blocking condenser 11, which may have a capacity of .002 microfarad, and wire 12 to one side of the oscillating circuit. The grid of tube 10 is also connected to the oscillating circuit by wire 13 through condenser 14 which may have a capacity of .00025 microfarad and which is shunted by resistor 15 having a resistance of about 10,000 ohms. The oscillating circuit comprises an inductance 16 and a condenser connected across the inductance, the capacity of the condenser being controlled by the speed of the vehicle on which the transmitter is located in a manner which will hereinafter be explained in detail. The wire 12 from the plate of tube 10 is connected to one side of the inductance 16 and wire 13 from the grid of the oscillator connects to the other end of the inductance. The grounded filament or cathode of the oscillator tube 10 is connected by wire 17 to a point on the inductance 16 which is ordinarily closer to the side of the inductance connected to the grid than to the side connected to the plate. The transmitting antennae 18 is connected through the condenser 19 to a point on the inductance 16 which is remote from the grounded portion thereof. The purpose of this much of the circuit is, when energized, to generate and transmit radio frequency oscillations.

It is desirable, however, to transmit modulated radio frequency waves, and for this purpose I provide a modulator vacuum tube 20 which may also be a type '30 triode tube. The plates of both oscillator and modulator tubes receive current from the positive side of battery 21 through the winding 22 of transformer 23. A radio frequency choke coil 28 of suitable inductance is in the line leading from winding 22 to the plate of oscillator tube 10 in order to prevent radio frequency current from passing into the plate supply or modulator portions of the circuit. Paralleling the other winding 24 of transformer 23 is a condenser 25 which may have a capacity of .00025 microfarad. One side of the winding 24 is connected to the grid of the modulator tube 20 and the other side of the winding is connected to the grounded side of the filament of tube 20. The winding 24 is so connected to the grid and filament of tube 20 that a sudden increase in current through winding 22 will induce a potential difference between grid and filament which will be in a direction to still further increase the current demanded by the plate of tube 20. The number of turns in the windings 22 and 24 may be in the ratio 10 to 1, respectively. Both tubes 10 and 20 receive filament current from a suitable battery 26 through a switch 27 which acts to energize the whole system. The switch 27 may be operated in conjunction with the ignition switch of an automobile on which the transmitter is located, or it may be the ignition switch itself.

The operation of the modulator is then as follows: Assume the oscillator to be oscillating and transmitting a continuous radio wave from the antennae, and drawing a certain plate current through the winding 22. If the plate current of the tube 20 increases, the voltage drop across the winding 22 increases, decreasing the plate voltage of the oscillator tube 10 and reducing the current in the oscillating circuit and consequently in the antennae. When the plate current of tube 20 decreases, the opposite effect is secured and the radiated power increases. Due to differences of phase in the system, the modulator tube will oscillate and continually change the plate current through the winding 22, thus continually changing or modulating the energy radiated from the antennae 18. The capacities and inductances in the modulator circuit are adjusted to provide a frequency of modulation preferably in the audible range in order that a receiving set tuned to the carrier radio frequency will emit an audible signal.

It has been stated that the capacity in the oscillating circuit of the oscillator is varied in response to the speed of the vehicle. For this purpose I employ a plurality of condensers 30, 31, 32, and 33 each of which has one terminal connected to wire 13. The other terminal of condenser 30 is connected to switch terminal 34; condenser 31 to terminal 35; condenser 32 to terminal 36 and condenser 33 to terminal 37. The terminals 34, 35, 36, and 37 are part of a switch 38 which is shown diagrammatically as having a switch arm 39 connected to wire 12 and adapted to be swung into connection with any of the terminals 34, 35, 36, 37. The switch 38 is controlled by the speed of the vehicle on which it is located in such manner that contact is made through terminal 34 at a vehicle speed of, say, 20 to 35 miles per hour; through terminal 35 at, say, 35 to 45 miles per hour; through terminal 36 at, say, 45 to 55 miles per hour; and through terminal 37 at speeds above 55 miles per hour. The condensers 30, 31, 32, and 33 all have substantially different capacities which are chosen together with the inductance of coil 16 so that the resonant frequency of the transmitting circuit progressively changes as the speed changes. Thus condenser 31 may be of smaller capacity than condenser 30; condenser 32 of smaller capacity than condenser 31; and condenser 33 of smaller capacity than condenser 32. The constants of the circuit are so chosen that the frequencies of the waves corresponding to different speed ranges are sufficiently separated from one another to assure that they can be accurately interpreted even though the constants of individual installations may vary slightly. The whole group of frequencies is preferably located in a region of the radio spectrum not allocated to other uses in order to avoid conflict. A speed controlled switch suitable for performing the functions demanded of switch 38, here shown diagrammatically, is shown and described in my copending patent application, Serial No. 715,049, filed March 12, 1934, which issued as Patent No. 2,117,440 on May 17, 1938. As disclosed in that patent, a pivoted switch member here shown diagrammatically at 39 is connected with the speedometer mechanism of the car along with the usual visible speed-indicating means, and having a normal path spaced from the series of terminals 34, 35, 36, and 37 so that the switch member operates in the same freely swinging manner as the visible indicating means. A cam means driven by the usual odometer mechanism of the car intermittently deflects the switch member 39 from its normal path to close a circuit through whichever of the terminals 34–37 happens to be opposite the switch member, the particular terminal corresponding to the instant speed of the car. When a circuit is closed by deflection of the switch member 39, it is held closed by an automatic latch that is released by the next operating movement of the intermittent means. Thus, if the intermittent means is adjusted to operate at each eighth of a mile of vehicle travel, a signal circuit closed to indicate a given speed will remain closed for one eighth of a mile of vehicle travel regardless of any reduction in speed in the course of that eighth of a mile.

By virtue of the switch equipped with a latching means, the signal occasioned by a speed violation will be prolonged through a substantial interval of time regardless of whether the violation continues through such interval. This feature favors the apprehension of speed violators and discourages any tendency of a driver to engage in a dangerous momentary burst of speed.

In operation, the practical effect of the use of such a switch in the transmitting circuit above-described is as follows. If a vehicle having this equipment starts down the street from rest and gradually accelerates, no signal is given out until the car has reached 20 miles per hour and the car has gone far enough for the switch to function. Thereupon a modulated radio frequency wave is transmitted and continues to be transmitted until the car speed exceeds 35 miles per hour. After the switch has again operated, the carrier frequency of the modulated wave is increased. When the speed exceeds 45 miles per hour, the carrier frequency again increases, and when the speed exceeds 55 miles per hour the carrier frequency is again increased. After the car has entered a given speed range and the corresponding frequency has been transmitted the frequency of the wave remains the same until the vehicle has traveled a sufficient distance to permit the switch to again operate, regardless of whether the vehicle may have, in the meantime passed into a different speed range.

Figure 3:
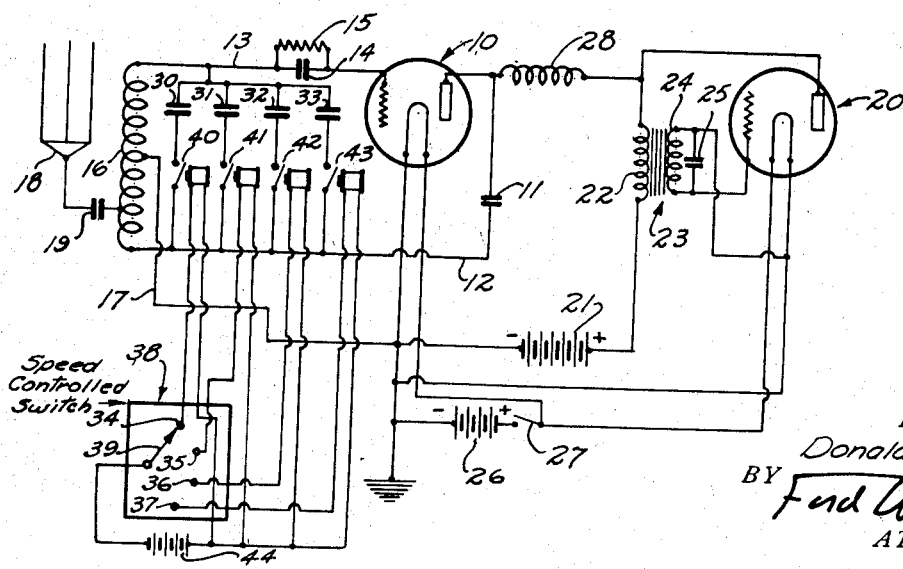
Fig. 3 is a diagram of an alternative electrical circuit employed in transmitting the speed-controlled signal from a moving vehicle.

In order to shorten the high frequency conductors connecting the various condensers in the oscillating circuit, I provide an alternative arrangement shown in Fig. 3. In this arrangement I connect the condensers in the oscillating circuit by means of electro-magnetically operated relay switches controlled by the speed-controlled switch 38. One terminal of each of the condensers 30, 31, 32, and 33 is connected to the wire 13. The other terminal of condenser 30 is connected to wire 12 through relay switch 40; the other terminal of condenser 31 through relay switch 41; the other terminal of condenser 32 through relay switch 42; and the other terminal of condenser 33 through relay switch 43. The electromagnet coils of the relay switches 40, 41, 42, 43 are connected between one terminal of the battery 44 and terminals 34, 35, 36, and 37, respectively, of the speed-controlled switch 38. The opposing switch contact 39 is connected to the other terminal of the battery 44. Thus when the contact arm 39 is contacting terminal 34, the coil of relay 40 is energized to hold switch 40 closed and keep condenser 30 in the oscillating circuit. When the contacting arm 39 moves to contact with another terminal, the relay connected thereto operates its switch and the switch 40 is opened. In this arrangement, as in that previously described, the switch 38 is only shown diagrammatically and is intended to represent the switch disclosed in my copending application above-referred to. The remainder of the circuit is the same in structure and operation as that of Fig. 1.

Figure 2:
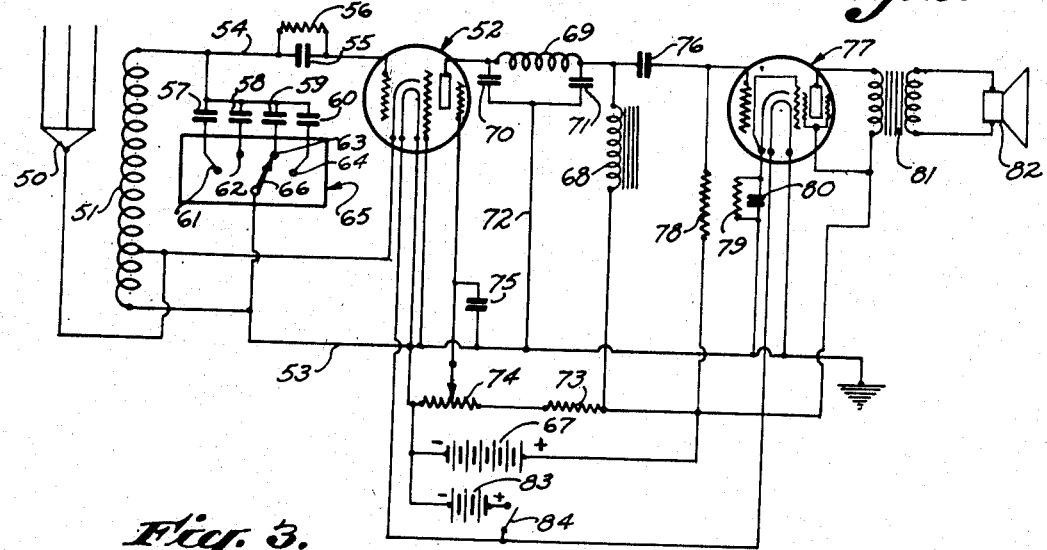
Fig. 2 is a diagram of the electrical circuit employed in receiving the signal transmitted from the moving vehicle.

For reception of the speed-controlled radio signal transmitted by the moving vehicle, I provide a receiving set suitable for installation in another vehicle, the electrical circuit of which is shown in Fig. 2. A receiving antennae 50 is connected to an inductance 51 at a point near one end, to which point the cathode of the vacuum tube 52 is also connected. The vacuum tube 52 is preferably 6D6 type of pentode tube having three grids. The end of inductance 51 nearest the point to which the antennae is connected connects through conductor 53 with one of the grids of tube 52 and is grounded. The other end of inductance 51 connects with the control grid of tube 52 through conductor 54 and condenser 55 which may be of .00025 microfarad and which is shunted by resistor 56 which may be of 5 megohms resistance.

Across the inductance 51 is connected a tuning condenser arranged to tune the receiving circuit to any of the four frequencies transmitted by the transmitters of Fig. 1 or Fig. 3. Condensers 57, 58, 59, and 60 each have one terminal connected with conductor 54 and the other terminal connected to terminals 61, 62, 63, and 64, respectively, of switch 65. Switch arm 66 of switch 65, adapted to contact any of the terminals 61, 62, 63, 64, is connected to the conductor 53. The capacities of these condensers and the inductance of the coil 51 are so adjusted that when the switch arm 66 is on terminal 61, the set is tuned to receive the signal transmitted by the circuit of Fig. 1 or Fig. 3 when condenser 30 is connected in its oscillating circuit; when condenser 58 is connected in the tuning circuit the set receives the signal transmitted when condenser 31 is connected in the oscillating circuit of the transmitter. Likewise when condenser 59 or 60 is connected in the tuning circuit the receiving set receives the signal transmitted when condenser 32 or 33, respectively, is in the oscillating circuit of the transmitter. Adjustable trimming condensers may be employed in parallel with the condensers in the tuning circuit. It is desirable that the tuning of the circuit be rather broad in order that the set will be certain to receive all signals of the frequency which is being selected, even if some of the transmitted waves are not exactly at the frequencies intended.

The plate of tube 52 receives current from the positive side of battery 67 through inductance 68 which may be of 500 henries, and through radio frequency choke coil 69. Coil 69 is shunted by two condensers 70 and 71 and a lead 72 is connected from their common point to the ground conductor 53. Across the battery 67 are resistor 73 and potentiometer 74, with the potentiometer connected to the negative side of the battery which is grounded. The adjustable arm of the potentiometer 74 is connected to the remaining grid of tube 52 and is connected through condenser 75 to ground. The resistor 73 may be of 25,000 ohms, and the potentiometer 74 of 50,000 ohms, while the condenser 75 may be of .5 microfarad capacity. The common point of connection of coils 68 and 69 is connected through condenser 76, of about .01 microfarad capacity, to the grid of vacuum tube 77 which may be a type 42 pentode tube. The grid of tube 77 is also connected by resistor 78 with ground. The cathode of tube 77 connects to ground through the resistor 79 which may be of 410 ohms and which is paralleled by condenser 80 which may be of .5 microfarad capacity. The plate of tube 77 receives current from the positive side of battery 67 through the primary winding of output transformer 81. To the secondary of the output transformer 81 is connected the head set or loud speaker 82. The heating filaments of both tubes 52 and 77 are supplied with current from the battery 83 through switch 84 which serves to energize the system. One side of the battery 83 is grounded.

In operation, the system performs as follows. The transmitter of Fig. 1 or Fig. 3 being located on the moving vehicle, automatically transmits, as explained above, a modulated radio frequency wave of a carrier frequency dependent upon the speed of the vehicle. The receiving set of Fig. 2 may be located on a police vehicle patrolling in the section near the transmitting vehicle. If the speed limit is 25 miles per hour in that vicinity, the police officer operating the receiving set would likely adjust switch 65 so that condenser 58 is in the tuning circuit. In this case, when the speed of the transmitting vehicle exceeds 35 miles per hour, a wave is transmitted having a radio frequency to which the receiving set is tuned, whereupon an audible note will issue from the loud speaker 82 warning the officer that some one is violating the law in that vicinity. The strength of the signal serves roughly as an indication of the proximity of the violator. Should the officer set his switch 65 to put condenser 59 into circuit he will receive only signals from cars going at speeds between 45 and 55 miles per hour, etc.

It will be seen that this system provides law enforcement officers with a very effective means for policing vehicles. As motor cars are continually becoming faster and more powerful and are more widely used by the public, the importance of the invention is easily appreciated.

While I have described my apparatus as operating at certain definite mentioned speeds, it will, of course, be understood that it may be made to operate at any chosen speeds or in any number of steps. I have illustrated my invention by use of a specific transmitting circuit and receiving circuit, but obviously any of the many suitable transmitting and receiving circuits known in the radio art can be employed to practice my invention. Instead of an audible signal from a loud speaker, any other sensible signal such as a light may be employed in connection with the receiving set. These and any other changes and modifications which may be made by those skilled in the art are intended to be included as a part of my invention so long as they are within the scope of the appended claims.

I claim as my invention:

1. In a system for policing a plurality of vehicles in traffic, the combination of: a radio receiving station tuned to a given radio frequency representative of a prohibited range of speed; a radio transmitter on each of said vehicles modulated to produce a signal of distinctive character at said receiving station; and means on each vehicle adapted in response to the speed of said vehicle to change the radio frequency of the associated transmitter to said given frequency when the vehicle travels in the corresponding prohibited range of speed.

2. In a system for policing a plurality of vehicles in traffic, the combination of: a radio receiving station tuned to a given radio frequency representative of a prohibited speed; a radio transmitter on each of said vehicles; a modulator incorporated in each of said transmitters adapted to modulate the transmitted waves at a signal frequency; a condenser of fixed capacity associated with each of said transmitters and adapted to tune the transmitter to said given radio frequency; a switch associated with each of said condensers to connect the condenser in the tuning circuit of the associated transmitter; and means on each vehicle for connection with the speed indicating mechanism of the vehicle and adapted to operate said switch, thereby to connect said condenser in the tuning circuit of the transmitter when the vehicle travels at said prohibited speed.

3. In a system for policing a plurality of vehicles in traffic, the combination of: a radio receiving station adapted to be tuned to predetermined frequencies representative of prohibited ranges of speed; a radio transmitter on each of said vehicles modulated to produce a signal of distinctive character at said receiving station; a plurality of radio frequency tuning condensers associated with each of said radio transmitters of fixed capacities corresponding to said prohibited ranges of speed; and a switch on each vehicle for connection with the speed indicating mechanism of the vehicle to operate in the prohibited speed ranges to connect in the tuning circuit of the associated radio transmitter that one of the condensers that corresponds to the instant speed of the vehicle.

4. In a system for policing traffic, the method of automatically indicating by a radio receiver at a traffic-supervision station speed violations among a plurality of vehicles, said method comprising: transmitting a radio signal from each of said vehicles when the vehicle travels at a prohibited speed; tuning said signal to a predetermined value indicative of the prohibited speed; and tuning said receiver to be selectively responsive to said value representing the prohibited speed, whereby said receiver will function as an automatic alarm to indicate speed violations.

5. In a system for policing traffic, the method of automatically indicating by a radio receiver at a traffic-supervision station speed violations among a plurality of vehicles, said method comprising: transmitting a radio signal from each of said vehicles when the vehicle travels at a prohibited speed; tuning said signal to a predetermined value indicative of the prohibited speed; tuning said receiver to be selectively responsive to said value representing the prohibited speed, whereby said receiver will automatically signal the traffic violation; and continuing said radio signal from the vehicle for a predetermined interval independently of any change in speed of the vehicle.

6. In a system for policing a plurality of vehicles in traffic, the combination of: a radio receiving station tuned to a given radio frequency representative of a prohibited range of speed; a radio transmitter on each of said vehicles modulated to produce a signal of distinctive character at said receiving station; a radio frequency control for said transmitter adapted to move into and out of a setting at said given frequency; and means for connection with the speed indicating mechanism of each vehicle to move said control into and out of said setting according to whether the vehicle travels in or out of said prohibited range of speed, said means being adapted to hold said setting for predetermined intervals of distance in the travel of the vehicle.

7. In a system for policing a plurality of vehicles in traffic, the method of indicating by means of a radio receiver at a traffic-supervision station violations of speed laws by any of said vehicles, said method comprising: transmitting a radio signal for a predetermined interval from any one of said vehicles whenever said vehicle enters a prohibited speed range; and tuning said receiver to be selectively responsive to said signal representing the prohibited speed, whereby said receiver will automatically give a signal for said predetermined minimum interval whenever one of the vehicles operates at the prohibited speed.

8. In a system for policing a plurality of vehicles in traffic, the method of indicating by means of a radio receiver at a traffic-supervision station violations of speed laws by any one of said vehicles, said method comprising: transmitting a radio signal from each of said vehicles; periodically changing the tuning of said signal to a value corresponding to the speed range in which the vehicle is momentarily traveling; and tuning said receiver to be selectively responsive to a value representing a prohibited speed.

DONALD E. MARSHALL.